United States Patent
Xu et al.

(10) Patent No.: US 11,375,243 B2
(45) Date of Patent: Jun. 28, 2022

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/927,200

(22) Filed: Jul. 13, 2020

(65) Prior Publication Data

US 2021/0021873 A1 Jan. 21, 2021

Related U.S. Application Data

(60) Provisional application No. 62/875,327, filed on Jul. 17, 2019.

(51) Int. Cl.
*H04N 19/96* (2014.01)
*H04N 19/176* (2014.01)
*H04N 19/44* (2014.01)

(52) U.S. Cl.
CPC .......... *H04N 19/96* (2014.11); *H04N 19/176* (2014.11); *H04N 19/44* (2014.11)

(58) Field of Classification Search
CPC .. H04N 19/176; H04N 19/159; H04N 19/593; H04N 19/70; H04N 19/119;

(Continued)

(56) References Cited

U.S. PATENT DOCUMENTS 7,330,509 B2  2/2008  Lu et al.
7,983,496 B2  7/2011  Liu et al.
(Continued)

FOREIGN PATENT DOCUMENTS

WO  2017/123980 A1  7/2017
WO  2018/141416 A1  8/2018

OTHER PUBLICATIONS

International Search Report and Written Opinion dated Sep. 30, 2020 in PCT/US20/41965, filed Jul. 14, 2020, 16 pages.

(Continued)

*Primary Examiner* — Peter D Le
(74) *Attorney, Agent, or Firm* — Arentfox Schiff LLP

(57) ABSTRACT

Aspects of the disclosure provide an apparatus that includes processing circuitry. The processing circuitry decodes coding information of a current coding tree block (CTB) from a coded video bitstream. The coding information indicates whether a current block split structure of the current CTB is based on reference partitioning information. In response to the current block split structure of the current CTB being based on the reference partitioning information, the processing circuitry determines the current block split structure for the current CTB based on an initial block split structure indicated in the reference partitioning information. The initial block split structure is (i) of a previously decoded CTB decoded prior to the current CTB in a decoding order or (ii) indicated by a high level header at a level higher than a CTB level. The processing circuitry partitions the current CTB according to the current block split structure.

20 Claims, 15 Drawing Sheets

(58) Field of Classification Search
CPC .... H04N 19/105; H04N 19/11; H04N 19/117; H04N 19/46; H04N 19/463; H04N 19/44; H04N 19/96; H04N 19/139; H04N 19/172; H04N 19/103; H04N 19/122; H04N 19/147; H04N 19/182; H04N 19/184; H04N 19/186; H04N 19/52

See application file for complete search history.

(56) References Cited

U.S. PATENT DOCUMENTS

| | | | |
|---|---|---|---|
| 8,085,852 B2 | 12/2011 | Liu et al. | |
| 8,238,442 B2* | 8/2012 | Liu | H04N 19/137 375/240.27 |
| 8,526,495 B2* | 9/2013 | Liu | H04N 19/159 375/240.12 |
| 8,605,784 B2* | 12/2013 | Min | H04N 19/593 375/240.12 |
| 8,995,529 B2* | 3/2015 | Lee | H04N 19/44 375/240.16 |
| 9,049,452 B2 | 6/2015 | Liu et al. | |
| 9,363,511 B2* | 6/2016 | Zhang | H04N 19/593 |
| 9,769,472 B2* | 9/2017 | Liu | H04N 19/33 |
| 10,136,144 B2 | 11/2018 | Liu et al. | |
| 10,205,968 B2 | 2/2019 | Liu et al. | |
| 10,397,569 B2* | 8/2019 | Liu | H04N 19/11 |
| 10,455,231 B2 | 10/2019 | Xu et al. | |
| 10,511,834 B2 | 12/2019 | Xu et al. | |
| 10,542,253 B2 | 1/2020 | Liu et al. | |
| 10,567,752 B2 | 2/2020 | Zhao et al. | |
| 10,575,013 B2 | 2/2020 | Liu et al. | |
| 10,582,195 B2 | 3/2020 | Liu et al. | |
| 10,587,881 B2 | 3/2020 | Xu et al. | |
| 10,587,885 B2 | 3/2020 | Ye et al. | |
| 10,595,019 B2 | 3/2020 | Chernyak et al. | |
| 10,609,384 B2* | 3/2020 | Chen | H04N 19/159 |
| 10,609,402 B2 | 3/2020 | Zhao et al. | |
| 10,609,403 B2* | 3/2020 | Xu | H04N 19/184 |
| 11,039,129 B2* | 6/2021 | Zhang | H04N 19/463 |
| 2008/0304569 A1* | 12/2008 | Lee | H04N 19/537 375/240.16 |
| 2009/0196342 A1* | 8/2009 | Divorra Escoda | H04N 19/156 375/240.02 |
| 2011/0038412 A1* | 2/2011 | Jung | H04N 19/132 375/240.12 |
| 2013/0101032 A1* | 4/2013 | Wittmann | H04N 19/80 375/240.12 |
| 2013/0279820 A1* | 10/2013 | Cohen | H04N 19/44 382/233 |
| 2013/0294517 A1* | 11/2013 | Fujibayashi | H04N 19/61 375/240.16 |
| 2014/0010469 A1* | 1/2014 | Yuan | H04N 19/61 382/233 |
| 2014/0079332 A1* | 3/2014 | Zheng | H04N 19/122 382/248 |
| 2014/0112593 A1* | 4/2014 | Zheng | H04N 19/61 382/248 |
| 2014/0161177 A1* | 6/2014 | Sim | H04N 19/70 375/240.03 |
| 2014/0253681 A1* | 9/2014 | Zhang | H04N 19/513 348/43 |
| 2015/0208067 A1* | 7/2015 | Jung | H04N 19/159 375/240.02 |
| 2017/0054996 A1 | 2/2017 | Xu et al. | |
| 2017/0078665 A1* | 3/2017 | Zheng | H04N 19/162 |
| 2017/0094271 A1* | 3/2017 | Liu | H04N 19/513 |
| 2017/0134749 A1* | 5/2017 | Park | H04N 19/597 |
| 2017/0280156 A1* | 9/2017 | Divorra Escoda | H04N 19/156 |
| 2018/0376137 A1* | 12/2018 | Jun | H04N 19/573 |
| 2019/0104312 A1* | 4/2019 | Lim | H04N 19/184 |
| 2020/0029077 A1* | 1/2020 | Lee | H04N 19/157 |

OTHER PUBLICATIONS

Bross et al., "General Video Coding Technology in Responses to the Joint Call for Proposals on Video Compression with Capability beyond HEVC," IEEE Transactions on Circuits and Systems for Video Technology, 2019 (16 pages).

Liu et al., "Deep Learning-Based Technology in Responses to the Joint Call for Proposals on Video Compression with Capability beyond HEVC," IEEE Transactions on Circuits and Systems for Video Technology, 2019 (14 pages).

Zhu et al., "Residual Convolutional Neural Network Based In-Loop Filter With Intra and Inter Frames Processed Respectively for AVS3," 2020 IEEE International Conference on Multimedia & Expo Workshops (ICMEW), London, UK, Jul. 2020 (6 pages).

Liu et al., "Joint Temporal-Spatial Bit Allocation for Video Coding With Dependency," IEEE Transactions on Circuits and Systems for Video Technology, vol. 15, No. 1, pp. 15-26, Jan. 2015 (13 pages).

Joshi et al., "High Efficiency Video Coding (HEVC) Screen Content Coding: Draft 4," JCTVC-U1005, 21st Meeting: Warsaw, PL, Jun. 19-26, 2015 (661 pages).

Joshi et al., "Screen content coding test model 1 (SCM 1)," JCTVC-Q1014, 17th Meeting: Valencia, ES, Mar. 27-Apr. 4, 2014 (5 pages).

Xu et al., "Block Vector Prediction in Intra Block Copy for HEVC Screen Content Coding," 2015 Data Compression Conference (10 pages).

Xu et al., "Intra block copy in Versatile Video Coding with Reference Sample Memory Reuse," 2019 Picture Coding Symposium (PCS) (5 pages).

Chen et al., "Screen Content Coding Using Non-Square Intra Block Copy for HEVC," 2014 IEEE International Conference on Multimedia and Expo (ICME), Chengdu, China, Jul. 2014 (6 pages).

Wang et al., "Intra Block Copy in AVS3 Video Coding Standard," 2020 IEEE International Conference on Multimedia & Expo Workshops (ICMEW), London, UK, Jul. 2020 (6 pages).

Liu et al., "Hybrid global-local motion compensated frame interpolation for low bit rate video coding," Journal of Visual Communication and Image Representation 14(1) (19 pages).

Liu et al., "Nonlinear motion-compensated interpolation for low-bit-rate video," Applications of Digital Image Processing XXIII 4115 (12 pages).

Zhang et al., "Intra Mode Coding in HEVC Standard," 2012 Visual Communications and Image Processing (6 pages).

Liu et al., "Bit-depth Scalable Coding for High Dynamic Range Video," Visual Communications and Image Processing 2008, vol. 6822 (10 pages).

Li et al., "Methodology and reporting template for neural network coding tool testing," JVET-M1006, 13th Meeting: Marrakech, MA, Jan. 9-18, 2019 (4 pages).

Liu et al., "JVET AHG report 9: Neural Networks in Video Coding (AHG9)," JVET-J0009, 10th Meeting: San Diego, US, Apr. 10-20, 2018 (3 pages).

Xu et al., "Intra Block Copy in HEVC Screen Content Coding Extensions," IEEE Journal on Emerging and Selected Topics in Circuits and Systems, Jun. 22, 2016 (11 pages).

Liu et al., "Overview of HEVC extensions on screen content coding," SIP vol. 4, E10, 2015 (12 pages).

International Telecommunication Union (ITU-T) Telecommunication Standardization Sector of ITU, "High Efficiency Video Coding", Series H: Audiovisual and Multimedia Systems Infrastructure of Audiovisual Services—Coding of Moving Video, H.265, Dec. 2016 (664 pages).

Jicheng An et al., "Quadtree plus Binary Tree Structure with JEM tools", Joint Video Exploration Team (JVET) of ITU-T SG 16 WP 3 and ISO/IEC JTC 1/SC 29/WG11, JVET-B0023, 2nd Meeting: San Diego, USA, Feb. 20-26, 2016 (10 pages).

(56) References Cited

OTHER PUBLICATIONS

Xiang Li et al., "Multi-Type-Tree", Joint Video Exploration Team (JVET) of ITU-T SG 16 WP 3 and ISO/IEC JTC 1/SC 29/WG11, JVET-D011 7r1, 4th Meeting: Chengdu, CN, Oct. 15-21, 2016 (3 pages).

Benjamin Bross et al., "Versatile Video Coding (Draft 3)", Joint Video Experts Team (JVET) of ITU-T SG 16 WP 3 and ISO/IEC JTC 1/SC 29/WG11, JVET-L1001-v7, 12th Meeting: Macao, CN, Oct. 3-12, 2018 (227 pages).

* cited by examiner

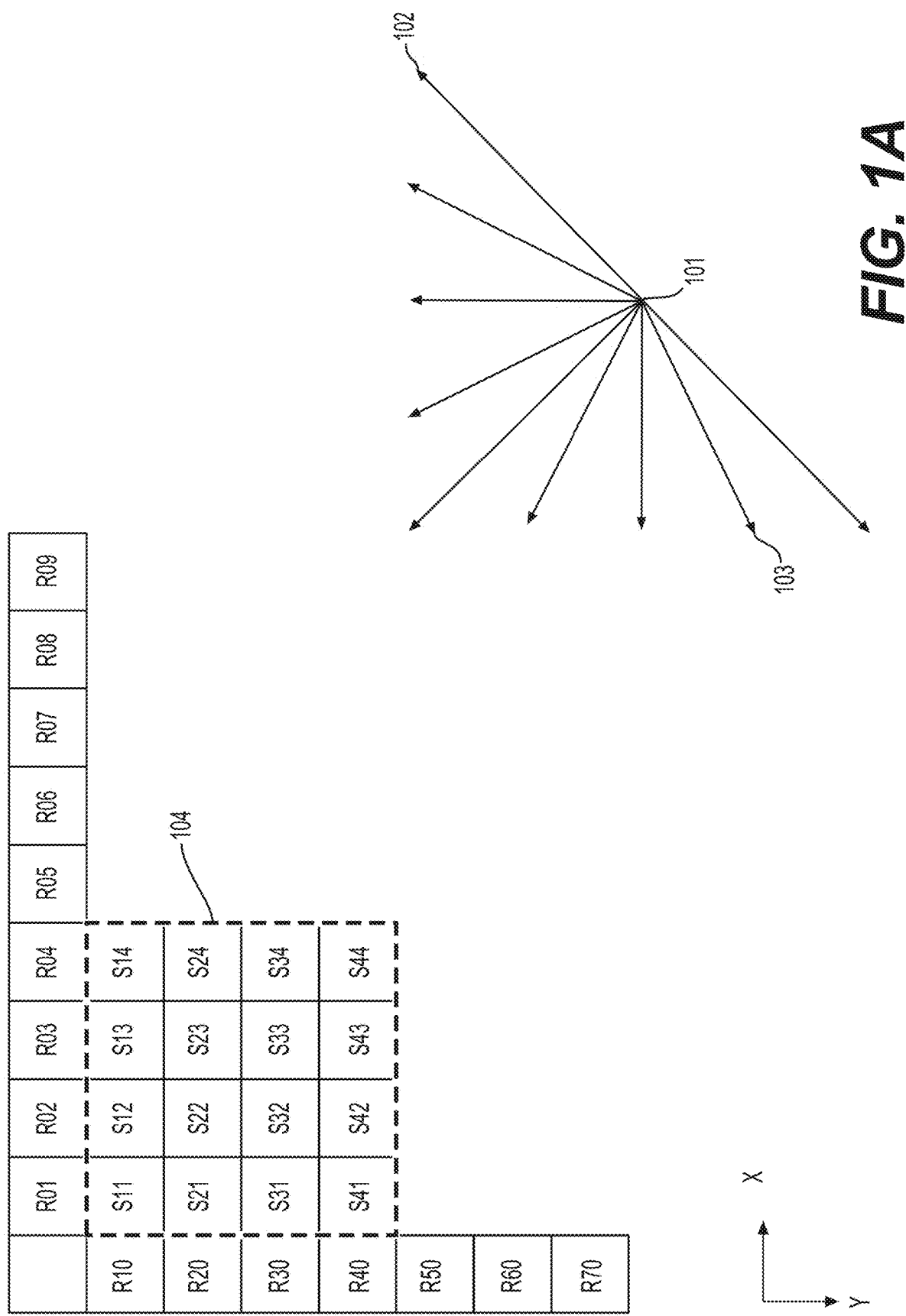

METHOD AND APPARATUS FOR VIDEO CODING

INCORPORATION BY REFERENCE

This present disclosure claims the benefit of priority to U.S. Provisional Application No. 62/875,327, "Methods for Block Structure Prediction" filed on Jul. 17, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can decode coding information of a current coding tree block (CTB) in a current picture from a coded video bitstream. The coding information can indicate whether a current block split structure of the current CTB is based on reference partitioning information. In response to the current block split structure of the current CTB being based on the reference partitioning information, the processing circuitry can determine the current block split structure for the current CTB based on an initial block split structure indicated in the reference partitioning information. The initial block split structure can be (i) of a previously decoded CTB decoded prior to the current CTB in a decoding order or (ii) indicated by a high level header at a level higher than a CTB level. The processing circuitry can partition the current CTB according to the current block split structure.

In an example, the previously decoded CTB is a spatial neighboring CTB of the current CTB, and the initial block split structure is of the spatial neighboring CTB of the current CTB.

In an example, the initial block split structure of the previously decoded CTB is stored in a history-based buffer.

In an example, the previously decoded CTB is a temporal neighboring CTB of the current CTB, and the initial block split structure is of the temporal neighboring CTB of the current CTB.

In an example, the initial block split structure is one of a plurality of block split structures included in the high level header, and the initial block split structure is indicated by an index included in the high level header.

In an embodiment, the processing circuitry determines a reference block split structure based on the initial block split structure indicated in the reference partitioning information, and determines the current block split structure based on the reference block split structure. The processing circuitry can modify the initial block split structure to obtain the reference block split structure. In an example, the coding information includes a flag indicating whether the reference block split structure is modified to obtain the current block split structure of the current CTB. The processing circuitry determines whether the reference block split structure is modified to obtain the current block split structure of the current CTB based on the flag. The current block split structure of the current CTB can be the reference block split structure. The processing circuitry can modify the reference block split structure to obtain the current block split structure for the current CTB.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

DETAILED DESCRIPTION OF EMBODIMENTS

Figure 1B:
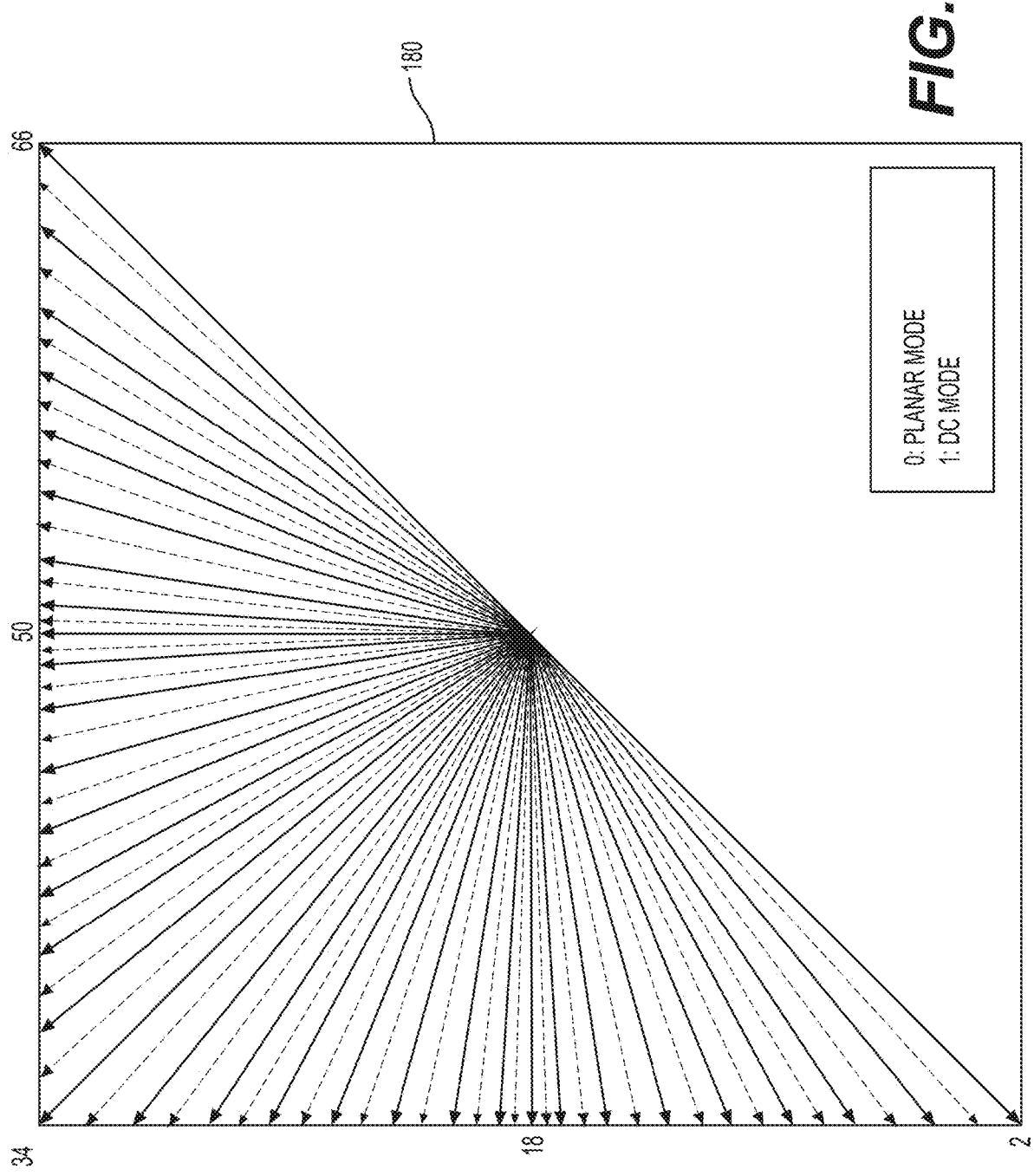
FIG. 1B is an illustration of exemplary intra prediction directions.
Figure 2:
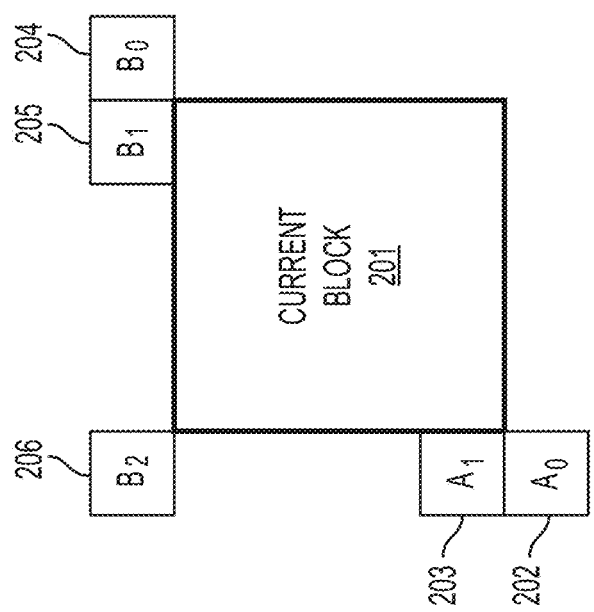
FIG. 2 is a schematic illustration of a current block and its surrounding spatial merge candidates in one example.
Figure 3:
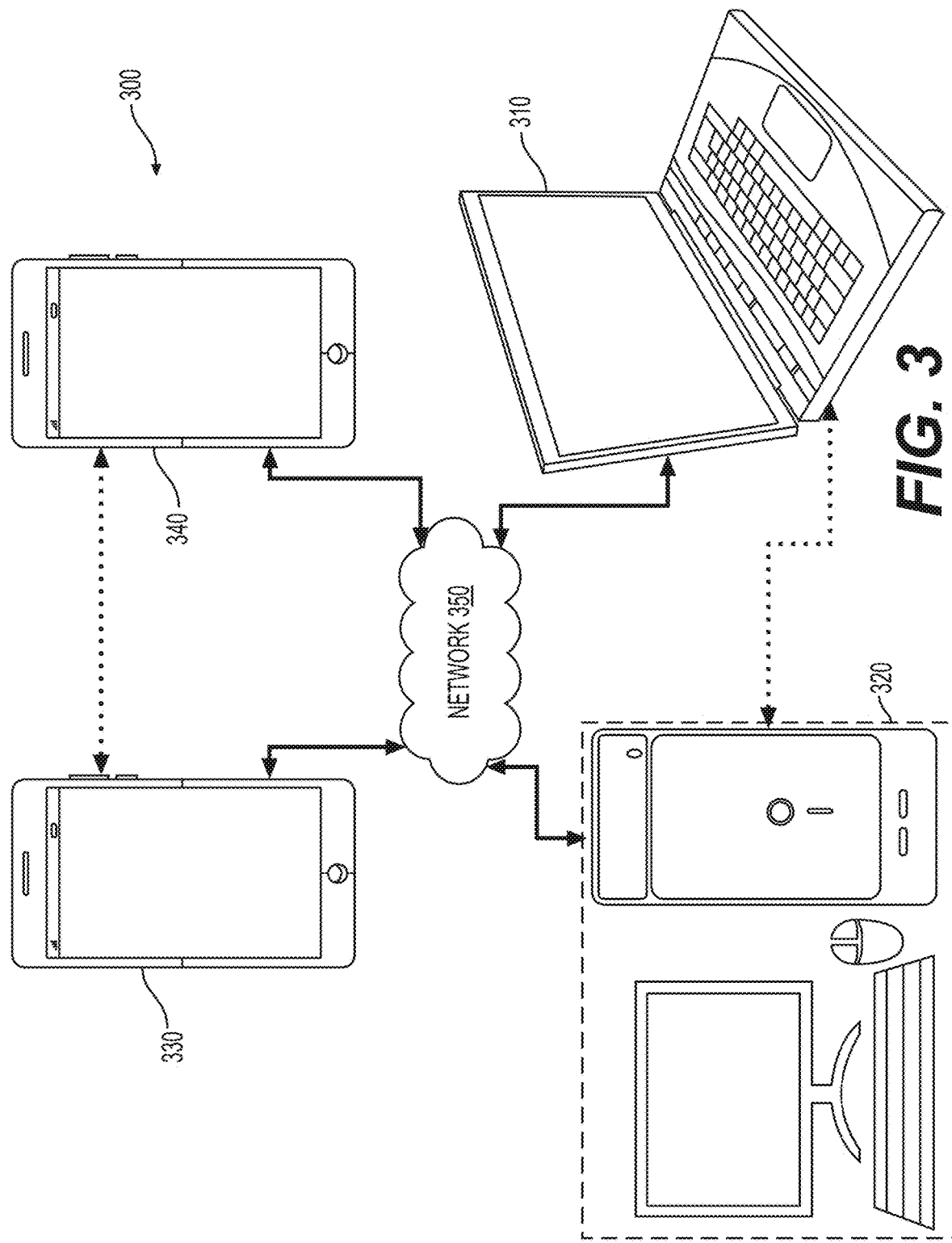
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
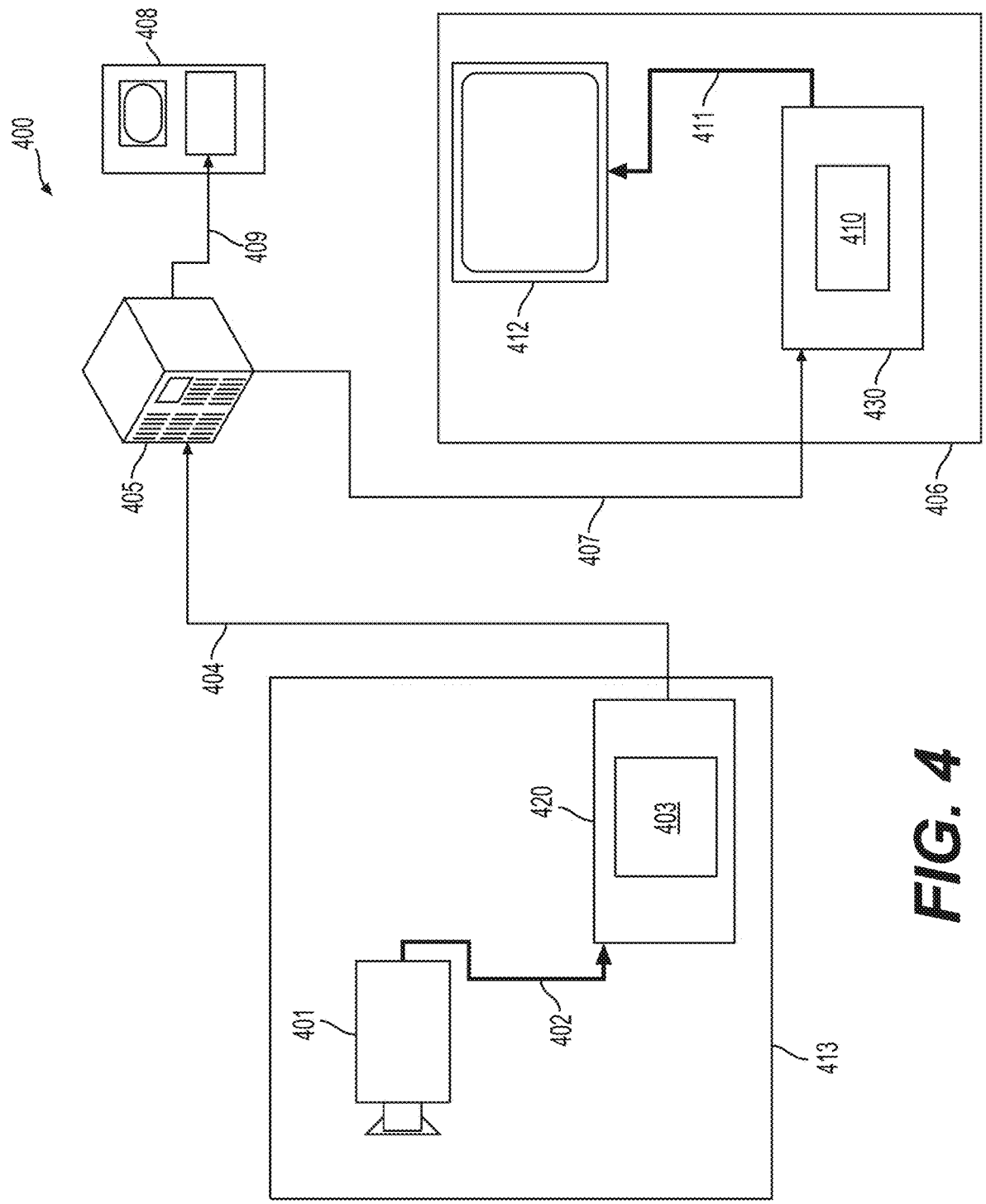
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
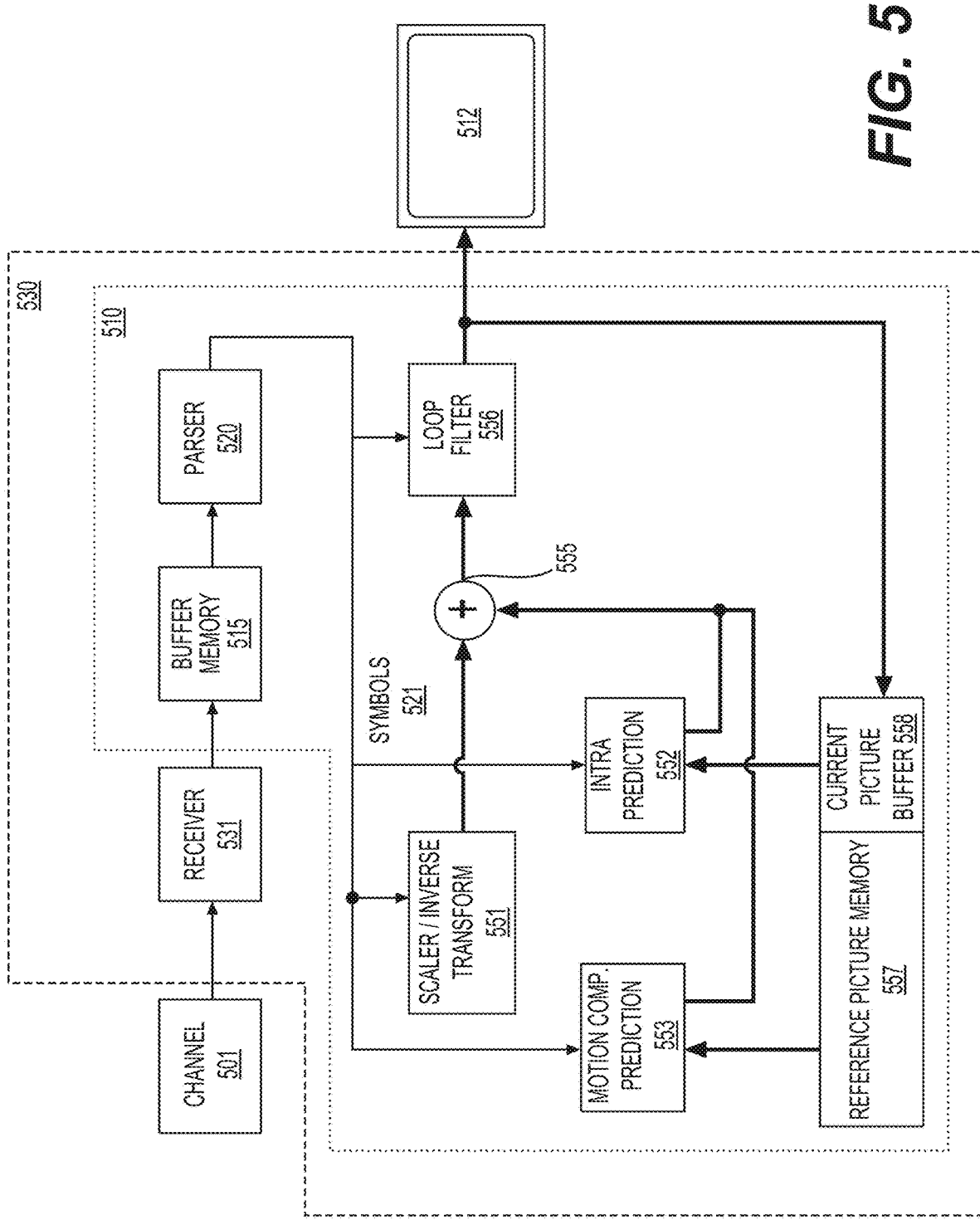
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
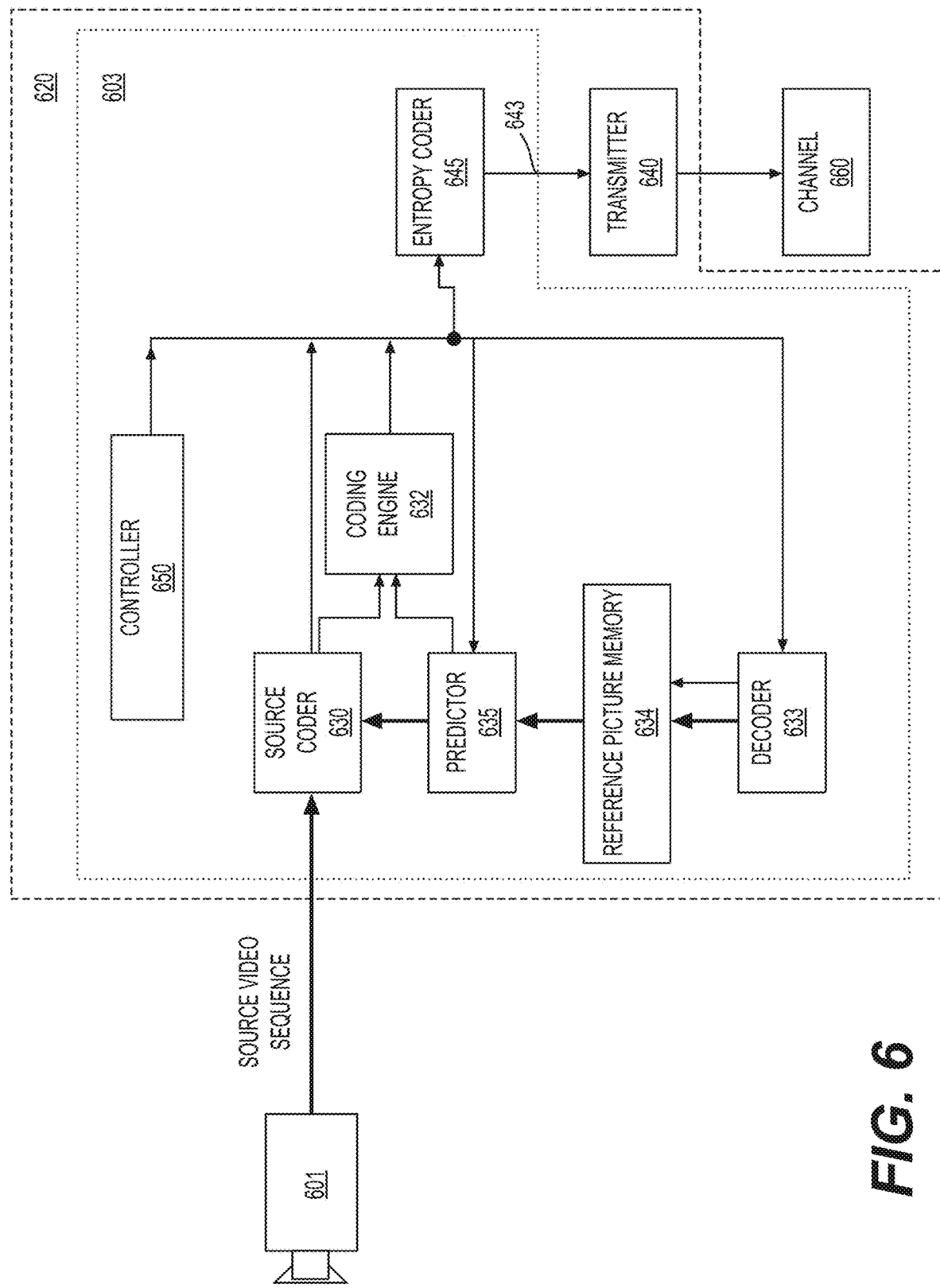
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
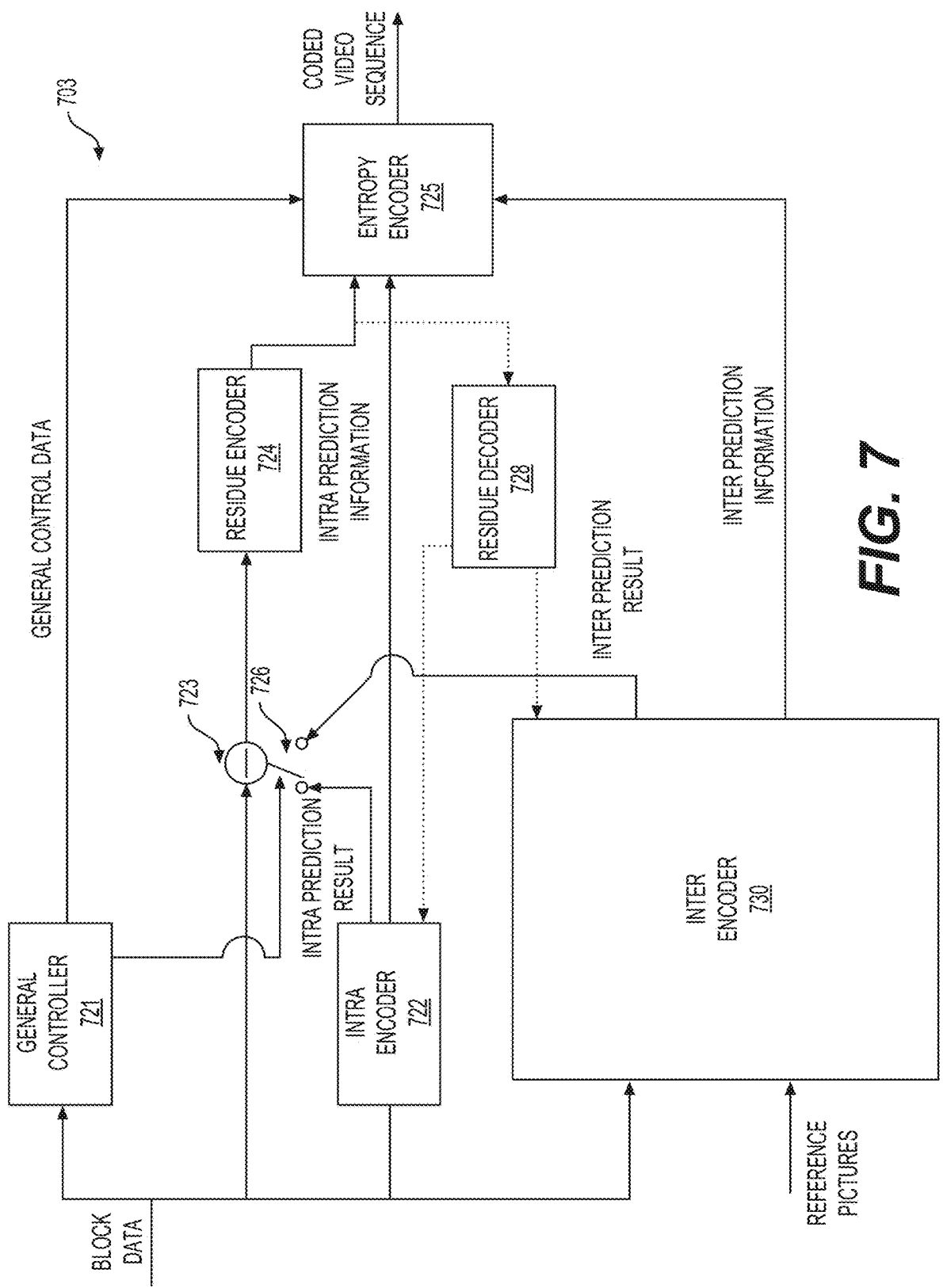
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
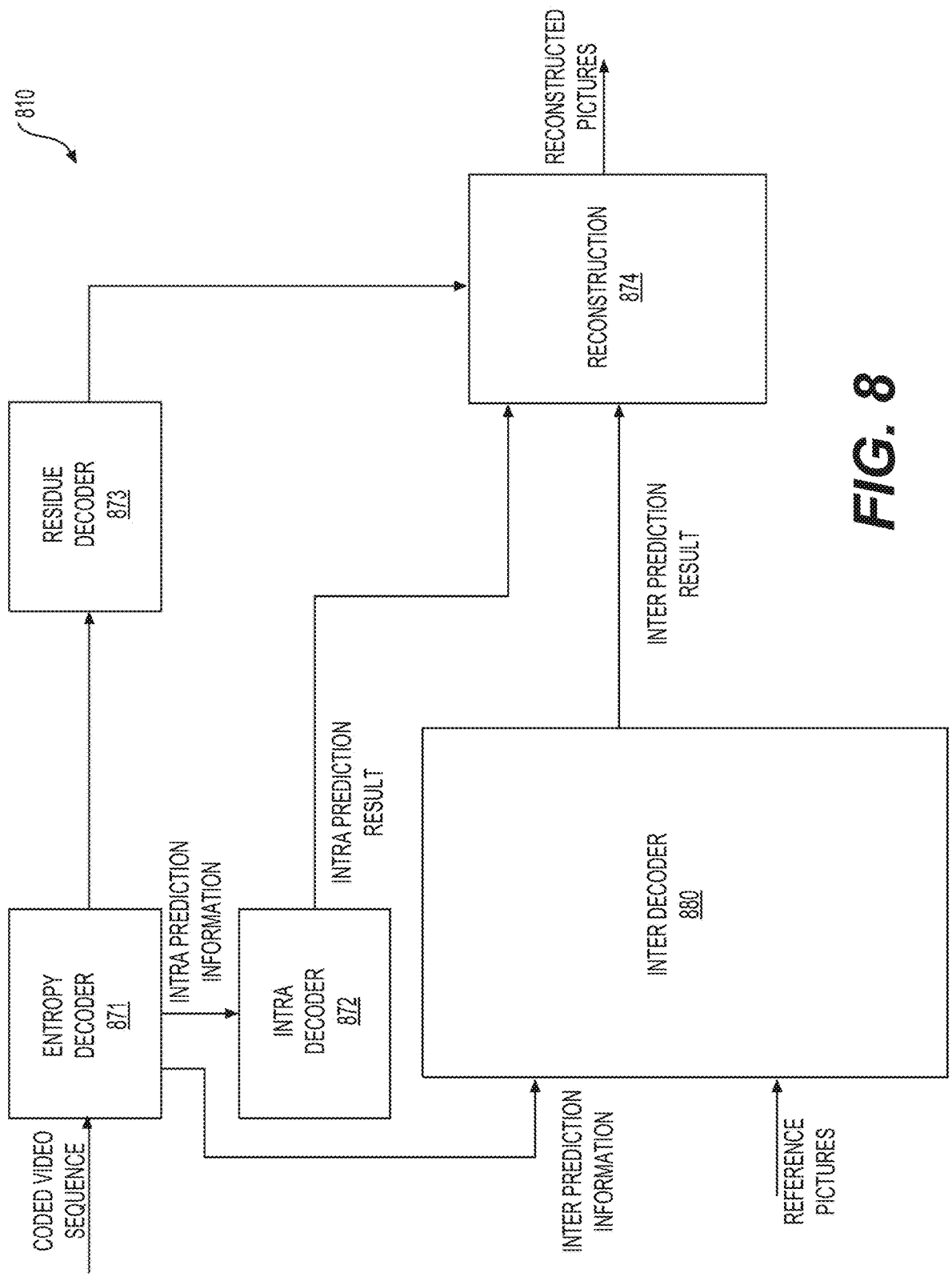
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

A block partition structure (e.g., in VVC) can include a quad-tree (QT) and multi-type tree (MTT). A block partitioning strategy called QT plus MTT can be used and can be referred to as QT+MTT. A picture can be divided into an array of non-overlapping CTUs. In an example, a CTU is a two-dimensional array of pixels or samples with up to 128×128 luma samples (and corresponding chroma samples). The CTU can be split into one or more smaller blocks using one or a combination of the following tree splitting methods. For each of the smaller blocks resulting from a parent block split, a flag (referred to as a split flag) can be used to signal whether a further split using one of a plurality of possible tree partitions is chosen. If not, the smaller block can be a leaf node of the split and can be processed as a coding unit (CU), using technologies such as prediction/transformation/quantization/entropy coding, and/or the like. Each time a split occurs, a depth of the smaller block from a corresponding parent block can be increased by 1. The split can continue from the root of the CTU (e.g., depth=0) to a certain defined maximum depth or until a minimum allowed block size (e.g., 4 samples each side) is reached. When the defined maximum depth or the minimum allowed block size is reached, the split flag is not signaled but can be inferred to be 0. On the other hand, at the root of the CTU, in some examples, the split can be inferred to be 1, such as for an I slice, it is implicitly inferred that each 128×128 samples can be split into four 64×64 samples at a first depth to incorporate a maximum transform size of 64×64.

The QT split can be used, for example, in HEVC and VVC. In an example, each parent block is split in half in both horizontal and vertical directions. The resulting four smaller partitions have a same aspect ratio as that of the parent block. In an example, a CTU is firstly split by the QT split, for example, recursively. Each QT leaf node (e.g., in a square shape) can be further split (e.g., recursively) using a MTT (e.g., binary-tree (BT) split, ternary-tree (TT) split) as described below.

The BT split can refer to a method that can divide a parent block in half in either a horizontal direction or a vertical direction. The resulting two smaller partitions are half in size as compared to the parent block.

The TT split can refer to a method that can divide a parent block into three parts in either a horizontal direction or a vertical direction, for example, in a symmetrical way. A middle part of the three parts can be twice as large as the other two parts. The resulting three smaller partitions are ¼, ½ and ¼ in size as compared to that the parent block.

Figure 9:
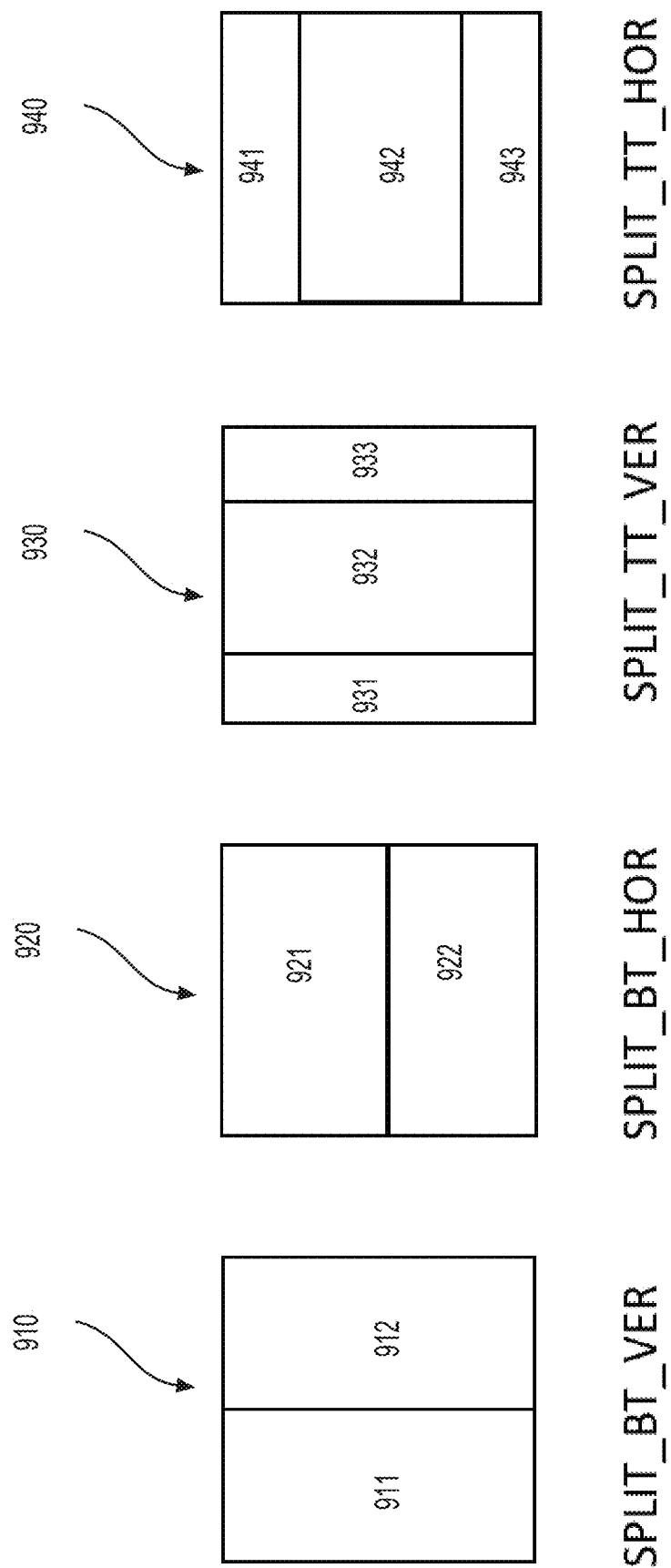
FIG. 9 shows examples of BT splits and TT splits according to embodiments of the disclosure.

In an example, such as VVC, a CU is a leaf node of block partitioning without being further split. A corresponding prediction unit (PU) and a transform unit (TU) can be of a same size as that of the CU unless the CU size exceeds the maximum TU size (e.g., where the residues can be split until the maximum TU size is reached). In an example, such as in HEVC, a PU size and a TU size can be smaller than a corresponding CU size. The block partitioning operation can be constrained by a maximum number of splits allowed (e.g., a split depth) from the CTU root and a minimum block height and width for a leaf CU. In some examples, the smallest CU size is 4×4 in luma samples. FIG. 9 shows examples of BT splits and TT splits according to embodiments of the disclosure. A block (or a parent block) (910) can be split using a vertical BT split into blocks (or child blocks) (911)-(912). A block (or a parent block) (920) can be split using a horizontal BT split into blocks (or child blocks) (921)-(922). A block (or a parent block) (930) can be split using a vertical TT split into blocks (or child blocks) (931)-(933). A block (or a parent block) (940) can be split using a horizontal TT split into blocks (or child blocks) (941)-(943).

Figure 10:
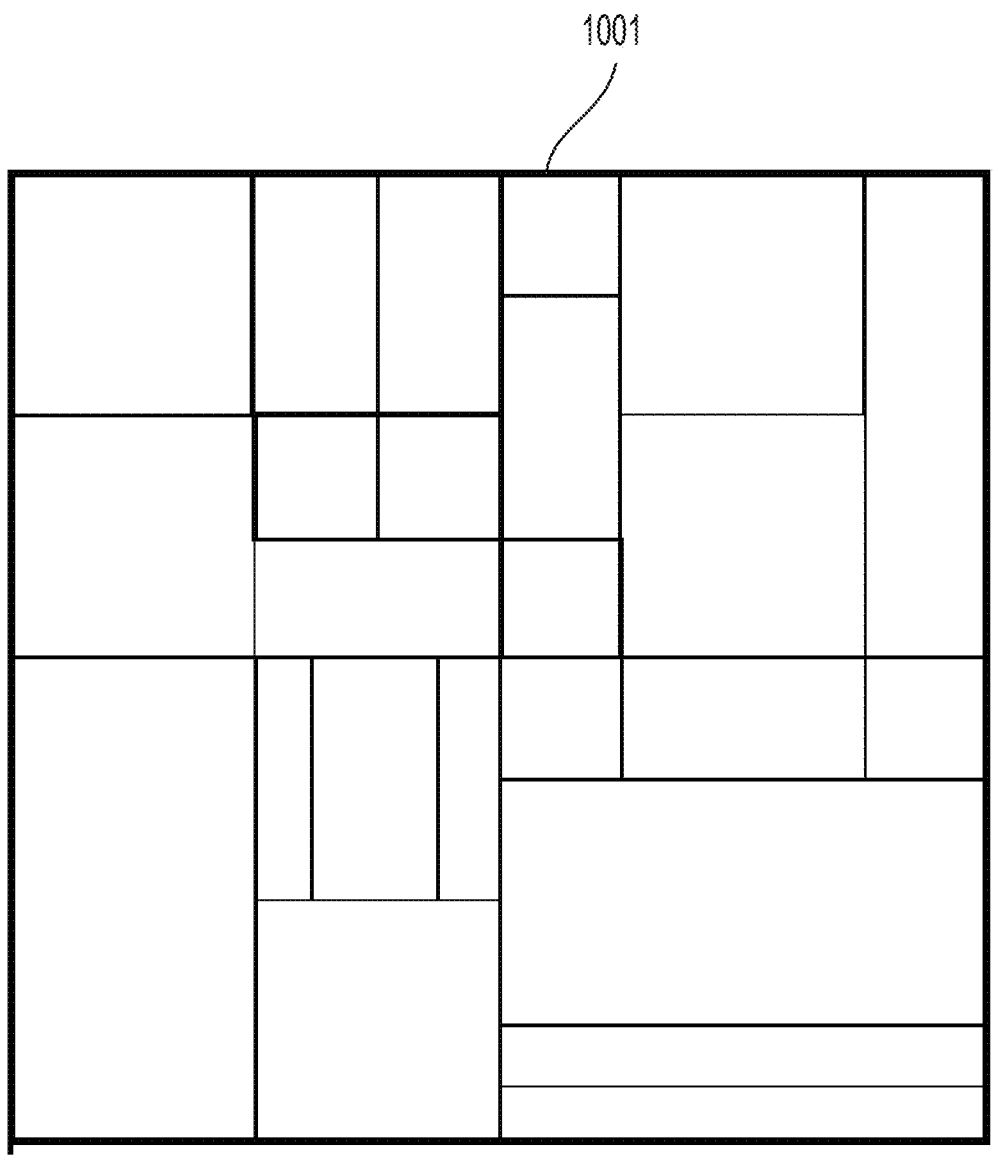
FIG. 10 shows an exemplary block partitioning of a CTU according to an embodiment of the disclosure.

FIG. 10 shows an example of a block partitioning result of a CTU (1001). The CTU (1001) can be partitioned using a QT plus MTT structure, for example, the CTU (1001) is split using a QT followed by QT(s), BT(s), and/or TT(s).

Besides the flexible block partitioning tools described above, for coding of an intra slice, the coding tree structures for luma samples and chroma samples of a CTU can be different (referred to as a dual-tree structure). Thus, chroma samples can have an independent coding tree block structure from the collocated luma samples in the same CTU, and thus the chroma samples can have larger coding block sizes than luma samples.

Table 1 shows an example syntax table for a block structure with recursive partitioning (e.g., a function coding_tree( )). The function coding tree( ) can be called depending on a type of a split flag. When there is no split, a coding_unit( ) function can be called to further parse syntax elements inside a CU. Certain flags (e.g., split_cu_flag, split_qt_flag, mtt_split_cu_vertical_flag, mtt_split_cu_binary_flag) in Table 1 can be signaled.

TABLE 1

A syntax table for a block structure with recursive partitioning

Descriptor coding tree(x0, y0, cbWidth, cbHeight, qgOn, cbSubdiv, cqtDepth, mttDepth, depthOffset, partIdx, treeType ) {
  If ((allowSplitBtVer | | allowSplitBtHor | | allowSplitTtVer | | allowSplitTtHor | | allowSplitQT)

TABLE 1-continued

A syntax table for a block structure with recursive partitioning

| | Descriptor |
|---|---|
|     && (x0 + cbWidth <= pic_width_in_luma_samples) | |
|     && (y0 + cbHeight <= pic_height_in_luma_samples)) | |
|   split_cu_flag | ae(v) |
| if(cu_qp_delta_enabled_flag && qgOn && cb Subdiv <= cu_qp_delta_subdiv) | |
| { | |
|   IsCuQpDeltaCoded = 0 | |
|   CuQpDeltaVal = 0 | |
|   CuQgTopLeftX = x0 | |
|   CuQgTopLeftY = y0 | |
| } | |
| if( split_cu_flag ) { | |
|   if( ( allowSplitBtVer \|\| allowSplitBtHor \|\| allowSplitTtVer \|\| allowSplitTtHor) && allowSplitQT ) | |
|     split_qt_flag | ae(v) |
|   if( !split_qt_flag ) { | |
|     if( ( allowSplitBtHor \|\| allowSplitTtHor) && | |
|       ( allowSplitBtVer \|\| allowSplitTtVer ) ) | |
|       mtt_split_cu_vertical_flag | ae(v) |
|     if( ( allowSplitBtVer && allowSplitTtVer && mtt_split_cu_vertical_flag) \|\| ( allowSplitBtHor && allowSplitTtHor && !mtt_split_cu_vertical_flag ) ) | |
|       mtt_split_cu_binary_flag | ae(v) |
|     if( MttSplitMode[ x0 ][ y0 ][ mttDepth ] == SPLIT_BT_VER) { | |
|       depthOffset += ( x0 + cbWidth > pic_width_in_luma_samples ) ? 1 : 0 | |
|       x1 = x0 + ( cbWidth / 2 ) | |
|       coding_tree( x0, y0, cbWidth / 2, cbHeight, qgOn, cbSubdiv + 1, | |
|               cqtDepth, mttDepth + 1, depthOffset, 0, treeType ) | |
|       if( x1 < pic_width_in_luma_samples ) | |
|         coding_tree( x1, y0, cbWidth / 2, cbHeightY, qgOn, cbSubdiv + 1, | |
|               cqtDepth, mttDepth + 1, depthOffset, 1, treeType ) | |
|     } else if( MttSplitMode[ x0 ][ y0 ][ mttDepth ] == SPLIT_BT_HOR ) { | |
|       depthOffset += ( y0 + cbHeight > pic_height_in_luma_samples ) ? 1 : 0 | |
|       y1 = y0 + ( cbHeight / 2 ) | |
|       coding_tree( x0, y0, cbWidth, cbHeight / 2, qgOn, cbSubdiv + 1, | |
|               cqtDepth, mttDepth + 1, depthOffset, 0, treeType ) | |
|       if( y1 < pic_height_in_luma_samples ) | |
|         coding tree( x0, y1, cbWidth, cbHeight / 2, qgOn, cbSubdiv + 1, | |
|               cqtDepth, mttDepth + 1, depthOffset, 1, treeType ) | |
|     } else if( MttSplitMode[ x0 ][ y0 ][ mttDepth ] == SPLIT_TT_VER ) { | |
|       x1 = x0 + ( cbWidth / 4 ) | |
|       x2 = x0 + ( 3 * cbWidth / 4 ) | |
|       qgOn = qgOn && ( cbSubdiv + 2 <= cu_qp_delta_subdiv ) | |
|       coding_tree( x0, y0, cbWidth / 4, cbHeight, qgOn, cbSubdiv + 2, | |
|               cqtDepth, mttDepth + 1, depthOffset, 0, treeType ) | |
|       coding_tree( x1, y0, cbWidth / 2, cbHeight, qgOn, cbSubdiv + 1, | |
|               cqtDepth, mttDepth + 1, depthOffset, 1, treeType ) | |
|       coding_tree( x2, y0, cbWidth / 4, cbHeight, qgOn, cbSubdiv + 2, | |
|               cqtDepth, mttDepth + 1, depthOffset, 2, treeType ) | |
|     } else { /* SPLIT_TT_HOR */ | |
|       y1 = y0 + ( cbHeight / 4 ) | |
|       y2 = y0 + ( 3 * cbHeight / 4 ) | |
|       qgOn = qgOn && ( cbSubdiv + 2 <= cu_qp_delta_subdiv ) | |
|       coding_tree( x0, y0, cbWidth, cbHeight / 4, qgOn, cbSubdiv + 2, | |
|               cqtDepth, mttDepth + 1, depthOffset, 0, treeType ) | |
|       coding_tree( x0, y1, cbWidth, cbHeight / 2, qgOn, cbSubdiv + 1, | |
|               cqtDepth, mttDepth + 1, depthOffset, 1, treeType ) | |
|       coding_tree( x0, y2, cbWidth, cbHeight / 4, qgOn, cbSubdiv + 2, | |
|               cqtDepth, mttDepth + 1, depthOffset, 2 , treeType) | |
|     } | |
|   } else { | |
|     x1 = x0 + ( cbWidth / 2 ) | |
|     y1= y0 + ( cbHeight / 2 ) | |
|     coding_tree( x0, y0, cbWidth / 2, cbHeight / 2, qgOn, cbSubdiv + 2, | |
|             cqtDepth + 1, 0, 0, 0, treeType ) | |
|     if( x1 < pic_width_in_luma_samples ) | |
|       coding_tree( x1, y0, cbWidth / 2, cbHeight / 2, qgOn, cbSubdiv + 2, | |
|               cqtDepth + 1, 0, 0, 1, treeType ) | |
|     if( y1 < pic_height_in_luma_samples ) | |
|       coding_tree( x0, y1, cbWidth / 2, cbHeight / 2, qgOn, cbSubdiv + 2, | |
|               cqtDepth + 1, 0, 0, 2, treeType ) | |
|     if( y1 < pic_height_in_luma_samples && x1 < pic_width_in_luma_samples ) | |
|       coding_tree( x1, y1, cbWidth / 2, cbHeight / 2, qgOn, cbSubdiv + 2, | |
|               cqtDepth + 1, 0, 0, 3, treeType ) | |
|   } | |
| } else | |

TABLE 1-continued

A syntax table for a block structure with recursive partitioning

| | Descriptor |
|---|---|
| coding_unit(x0, y0, cbWidth, cbHeight, treeType) | |
| } | |

In some examples, a block split structure (also referred to as a CTU split structure, a block partitioning structure, or a CTU partitioning structure) of each CTU is signaled independent of each other, and thus no information of block split structures of previously coded CTUs is used as a predictor or a reference for a block split structure of a current CTU.

In various examples, a block split structure can indicate one or more of a maximum split depth, a minimum size of a CU, a partition or splitting method (e.g., QT, a MTT such as a BT, a TT), whether and how to partition at an intermediate node, and/or the like. Information of the block split structure may be pre-determined, inferred, and/or signaled.

According to aspects of the disclosure, a current block split structure for a current CTU (e.g., a CTB, a luma CTB, chroma CTB(s), and/or the like) in a current picture can be determined based on reference partitioning information of a previously decoded CTU decoded prior to the current CTU in a decoding order. The previously decoded CTU decoded prior to the current CTU in the decoding order can be any suitable previously decoded CTU in the current picture or in a different picture. For example, the reference partitioning information of the previously decoded CTU can include a block split structure of the previously decoded CTU. Alternatively, the current block split structure for the current CTU can be determined based on reference partitioning information indicated by a high level header, for example, at a level (or a high level) higher than a CTU level. In an example, the reference partitioning information in the high level header can indicate (e.g., include) high-level block split structure(s) available for CTUs associated with the high level (e.g., a picture level, a slice level), and an index in the high level header can indicate which of the high-level block split structure(s) is to be used for determining the current block split structure for the current CTU. In an example, CTUs associated with the picture level can refer to CTUs in the picture, and CTUs associated with the slice level can refer to CTUs in the slice. The high-level block split structure(s) in the high level can be used by the CTUs associated with the high level, such as the CTUs in the same sequence, the CTUs in the same picture, or the like. A first subset of CTUs associated with a same level (e.g., in the same picture, in the same sequence) may be partitioned based on a first high-level block split structure. A second subset of CTUs associated with the same level (e.g., in the same picture, in the same sequence) may be partitioned based on a second high-level block split structure.

In some examples, the current block split structure for the current block can be identical to an initial block split structure (e.g., the block split structure of the previously decoded CTU, one of the high-level block split structure in the high level header). Thus, no signaling is needed in some examples since the initial block split structure does not need to be signaled. In some examples, a single flag is signaled to indicate a selection of the initial block split structure.

Alternatively, the initial block split structure can be modified to obtain the current block split structure for the current block. In some examples, the initial block split structure can first be modified to obtain a reference block split structure. Subsequently, the reference block split structure can be modified to obtain the current block split structure. Since the initial block split structure and/or the reference block split structure are not signaled, fewer flags can be signaled as compared to recursively partitioning the current CTU using methods described in Table 1.

In an embodiment, coding information of the current CTU can be decoded from a coded video bitstream. The coding information can indicate whether the current block split structure of the current CTU is based on the reference partitioning information. In response to the current block split structure of the current CTU being based on the reference partitioning information, the current block split structure for the current CTU can be determined based on an initial block split structure indicated in the reference partitioning information. The initial block split structure can be (i) the block split structure of the previously decoded CTU or (ii) one of the high-level block split structure(s) indicated by the high level header. Further, the current CTU can be partitioned according to the current block split structure.

In some examples, determining (e.g., predicting) the current block split structure for the current CTU based on block structure information that is not specific to the current block split structure of the current CTU can improve coding efficiency. The block structure information can indicate block split structure(s) of previously coded CTU(s) or block split structure(s) in a high level header. Fewer flag(s) can be signaled when the current block split structure for the current CTU is based on a block split structure of a previously coded CTU, for example, since the block split structure of the previously coded CTU may not needed to be signaled. Fewer flag(s) can be signaled when the current block split structure for the current CTU is based on a block split structure (also referred to as high-level block split structure) in a high level header, for example, since the high-level block split structure can be shared by CTUs in the high level (e.g., a sequence level, a picture level). In an example, a first number of high-level block split structures is shared by a second number of CTUs in the same high level where the second number can be much larger than the first number.

According to aspects of the disclosure, the current block split structure for the current CTU can be determined (e.g., predicted) from block split structure(s) of other CTU(s) (e.g., previously coded CTU(s)).

The current block split structure for the current CTU can be determined (e.g., predicted) based on reference partitioning information (also referred to as partitioning information) of the previously coded CTU(s). In an example, at the CTU level, a flag (e.g., a structure prediction flag (SPF) or spf flag) is used to signal usage of prediction for the current block split structure for the current CTU before parsing split flags for the current CTU at a CTU root. If the SPF (e.g., spf flag) is true, a reference block split structure (or a reference CTU split structure, a block split structure predictor, a block partitioning structure predictor) can be determined (e.g., derived or generated) as a predictor for the block split structure for the current CTU. If the SPF (e.g., spf flag) is false, the current block split structure for the current CTU can be coded independently, for example, based on signaling at each level to indicate if a further split is to be used and a type of the split. When the current block split structure for the current CTU is coded independently, the current block split structure for the current CTU is not dependent or is not based on a block split structure of a previously coded CTU.

As described above, the current block split structure for the current CTU can be based on the reference partitioning information of the previously coded CTU(s), for example, that are coded prior to the current CTU in a coding order. In an example, at a decoder side, the previously coded CTU(s) are decoded prior to the current CTU in a decoding order. The reference partitioning information of the previously coded CTU(s) can include block split structure(s) of the previously coded CTU(s) used to partition the respective previously coded CTU(s). In some examples, the reference partitioning information further includes a flag or an index indicating which of the block split structure(s) of the previously coded CTU(s) can be used for the current block split structure for the current CTU.

The reference partitioning information of the previously coded CTU(s) can be obtained based on spatial neighboring CTU(s) of the current CTU. Block split structure(s) of the spatial neighboring CTU(s) can be used to predict the current block split structure of the current CTU. The previously decoded CTU(s) can be the spatial neighboring CTU(s) of the current CTU. The initial block split structure can be of one of the spatial neighboring CTU(s). The spatial neighboring CTU(s) can be adjacent to the current CTU.

In an example, the reference block split structure is determined based on the spatial neighboring CTU(s), for example, the block lock split structure(s) of the spatial neighboring CTU(s), and subsequently, the current block split structure is determined based on the reference block split structure.

The current block split structure of the current CTU can be predicted by information (e.g., reference partitioning information) of a previously coded CTU. In an example, the information (e.g., the reference partitioning information) can be from a same coding tile, coding slice, or coding tile group as that of the current CTU. Thus, a prediction of the current block split structure can be referred to as a spatial prediction. The spatial prediction may be determined from the information of spatial neighboring CTU(s) of the current CTU, for example, a left CTU or a left coded CTU that is a CTU to the left of the current CTU, a top CTU (also referred to as an above CTU) or a top coded CTU that is on top of the current CTU, and/or a top-left CTU (also referred to as an above-left CTU) or a top-left coded CTU that is the CTU on a left top corner of the current CTU. Accordingly, the spatial neighboring CTU(s) of the current CTU can include but are not limited to, the left coded CTU, the top coded CTU, and/or the top-left coded CTU.

The reference partitioning information of the previously coded CTU(s) can be obtained from a history-based buffer (or a history buffer). The history-based buffer can store one or more block split structures of the previously coded CTU(s). In an example, the previously coded CTU(s) are in the current picture. The previously coded CTU(s) for the history-based buffer can include CTU(s) that are adjacent to the current CTU and/or CTU(s) that are not adjacent to the current CTU. In some examples, the previously coded CTU(s) for the history-based buffer can include CTU(s) from a picture that is different from the current picture. The one or more block split structures in the history-based buffer can be used to predict the current block split structure of the current CTU. The initial block split structure of the previously decoded CTU is one of the one or more block split structures in the history-based buffer. In an example, the reference block split structure is determined based on one of the one or more block split structures in the history-based buffer, and subsequently, the current block split structure is determined based on the reference block split structure.

In various examples, the history-based buffer for the previously coded CTU(s) in the coding order (e.g., an encoding order, a decoding order) can be maintained to store the one or more block split structures of the previous coded CTU(s). A buffer size N (e.g., a positive integer) indicates that the history-based buffer includes N entries. Entries in the history-based buffer can be updated. When used, an index of a block split structure from the one or more block split structures in the history-based buffer can be signaled. Any suitable method can be used for index coding. In an example, the one or more block split structures in the history-based buffer include a plurality of block split structures and indices for the plurality of block split structures can be coded with suitable codewords.

In an example, a first-in-first-out (FIFO) rule is applied to maintain the history-based buffer. Thus, the history-based buffer can keep the information of the block split structure(s) of N most recent coded CTU(s) in the coding order.

In an example, an entry for the most recent coded CTU can be put in a last position (or a most recent position) of the history-based buffer. A shortest codeword can be used for index coding of the last position of the history-based buffer when the last position is used for predicting the current block split structure for the current CTU.

In an example, when the entries are put into the history-based buffer, positions (e.g., locations relative to the current CTU) of the previously coded CTU(s) (also referred to as reference CTU(s)) are stored in the history-based buffer, for example, in addition to the block split structure(s) of the previously coded CTU(s). When selected for predicting the current block split structure for the current CTU, the locations relative to the current CTU may also be considered for designing codewords for index coding. For example, a first index of a first one of the plurality of block split structures for a first previously coded CTU uses a shorter codeword than a second index of a second one of the plurality of block split structures for a second previously coded CTU when a first location of the first previously coded CTU is closer to the current CTU than a second location of the second previously coded CTU.

The reference partitioning information of the previously coded CTU(s) can be obtained based on temporal neighboring CTU(s) of the current CTU. Block split structure(s) of the temporal neighboring CTU(s) (e.g., in a reference picture that is different from the current picture) can be used to predict the current block split structure of the current CTU. The previously decoded CTU(s) can be the temporal neighboring CTU(s) of the current CTU, and the initial block split structure can be of one of the temporal neighboring CTU(s) of the current CTU.

In an example, the reference block split structure is determined based on the temporal neighboring CTU(s), for example, the block lock split structure(s) of the temporal neighboring CTU(s), and subsequently, the current block split structure is determined based on the reference block split structure.

Figure 11:
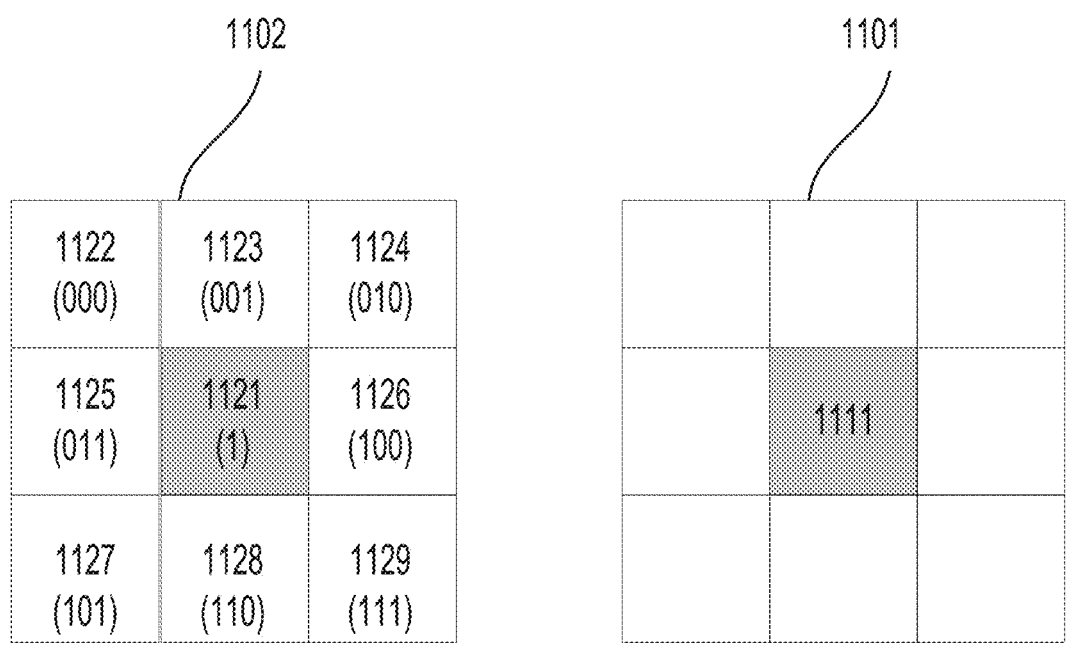
FIG. 11 shows an example of using temporal neighboring CTU(s) to predict the current block split structure for a current CTU according to an embodiment of the disclosure.

FIG. 11 shows an example of using temporal neighboring CTU(s) to predict the current block split structure for a current CTU (1111) according to an embodiment of the disclosure. The current CTU (1111) is in a current picture (1101). In an example, a reference picture (1102) is determined. For example, the reference picture (1102) is a collocated picture used to derive a TMVP MV predictor. A CTU (1121) is a collocated CTU of the current CTU (1111). The temporal neighboring CTU(s) used to predict the current block split structure for the current CTU (1111) can include any suitable CTU(s) in the reference picture (1102). In an example, the temporal neighboring CTU(s) include the collocated CTU (1121) and one or more of neighboring CTUs (1122)-(1129) of the collocated CTU (1121). The temporal neighboring CTU(s) can also be referred to as reference CTU(s).

In an example, the collocated CTU (1121) is assigned the shortest codeword for index coding, and the eight neighboring CTUs (1122)-(1129) of the collocated CTU (1121) are assigned with fixed length (e.g., 3-bit) codewords for index coding. In an example, the codewords for the CTUs (1121)-(1129) are 1, 000, 001, 010, 011, 100, 101, 110, and 111, respectively, as shown in FIG. 11. Accordingly, when the block split structure of the CTU (1121) is used to predict the current block split structure of the current CTU (1111), an index of '1' can be signaled. Alternatively, when the block split structure of the CTU (1128) is used to predict the current block split structure of the current CTU (1111), an index of '110' can be signaled.

As described above, the reference partitioning information can be indicated by the high level header. Information (e.g., the reference partitioning information) of the block split structure(s) (also referred to as high-level block split structure(s)) can be stored in the high level header, such as in a slice header, a PPS, a SPS, or the like. The reference partitioning information can include the high-level block split structure(s). In an example, the high level is higher than the CTU level. When the reference partitioning information including the high-level block split structure(s) is used at the CTU level, an index indicating one of the high-level block split structure(s) can be sent. In an example, the index indicates a position of the one of the high-level block split structure(s) in a storage buffer (e.g., the high level header).

In an example, the high-level block split structure(s) include a plurality of block split structures in the high level header, and the initial block split structure is one of the plurality of block split structures and is indicated by an index included in the high level header.

The high-level block split structure(s) can be used to predict the current block split structure of the current CTU. In an example, the reference block split structure is determined based on the high-level block split structure(s), and subsequently, the current block split structure is determined based on the reference block split structure.

For each coded slice or coded picture, the reference partitioning information (also referred to as predictor information) in the storage buffer may be updated (e.g., partially or completely) for the coded slice or the coded picture. For example, predictors (e.g., high-level block split structures) A1-A10 can be derived from a PPS of a first picture. The storage buffer can include information of the predictors A1-A10 the first picture. CTUs in the first picture can refer to the predictors A1-A10 to obtain block split structures for the respective CTUs in the first picture. When parsing a PPS of a second picture, for example, after parsing the PPS of the first picture, an indication of keeping the predictors A6-A10 is received, together with information of predictors B1-B5. The storage buffer can include the information of the predictor B1-B5 and the information of the predictors A6-A10 for the second picture. CTUs in the second picture can refer to the predictors A6-A10 and the predictor B1-B5 to obtain block split structures for the respective CTUs in the second picture.

As described above, the reference block split structure for the current CTU can be determined based on the reference partitioning information, such as the block split structure(s) of the previously coded CTU(s), the high-level block split structure(s) indicated in the high level header, or the like.

In an example, an initial block split structure (e.g., the block split structure of the previously coded CTU, the high-level block split structure indicated (e.g., included) in the high level header, or the like) is used directly as the reference block split structure, and thus the reference block split structure is the initial block split structure. Alternatively, the initial block split structure (e.g., the block split structure of the previously coded CTU, the high-level block split structure indicated (e.g., included) in the high level header, or the like) can be processed or modified to obtain the reference block split structure, and thus the reference block split structure is different from the initial block split structure. Certain partitioning information in the initial block split structure can be removed. Certain partitioning information in the initial block split structure can be approximated or replaced by new partitioning information.

Figure 12:
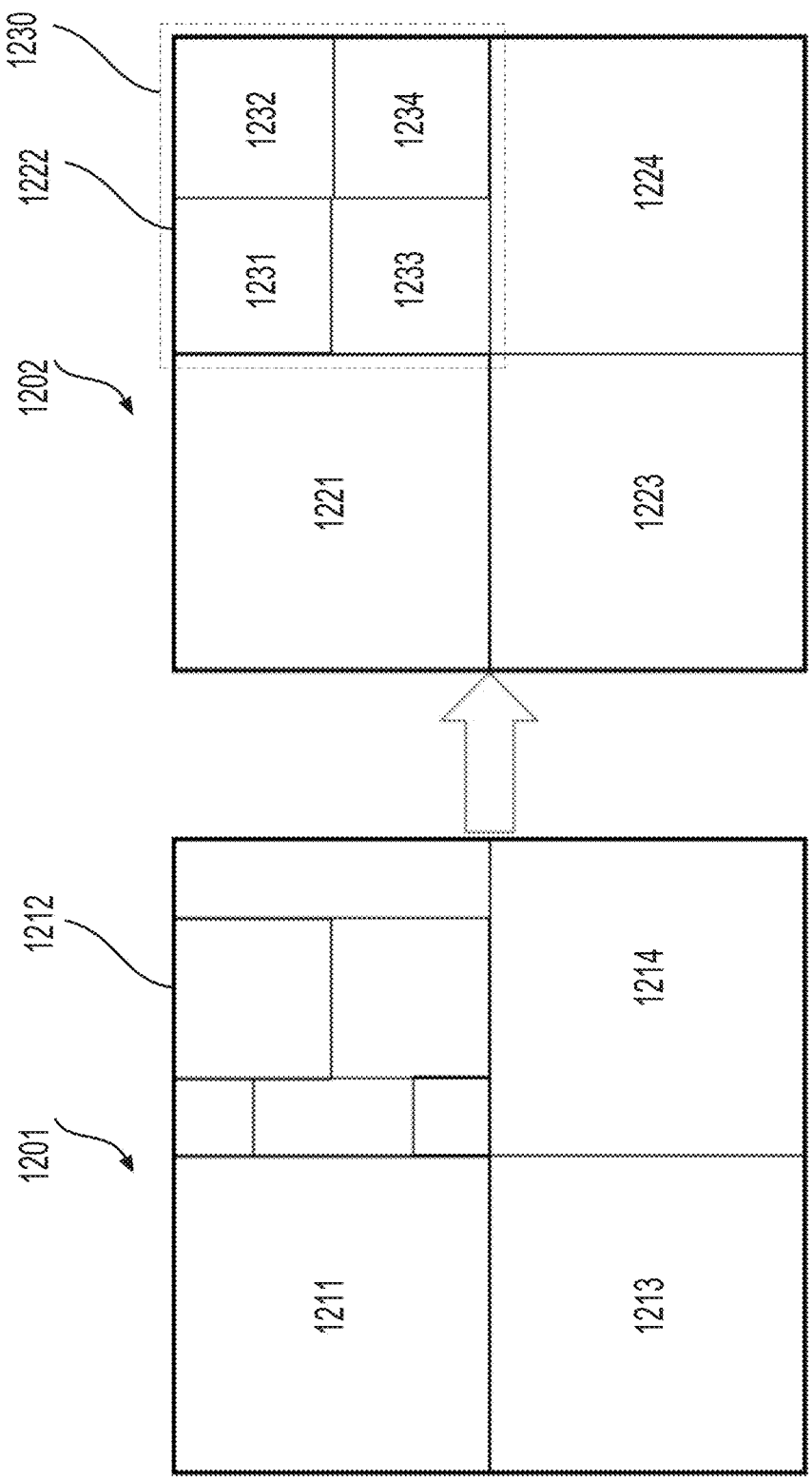
FIG. 12 shows an example where a block split structure is modified to obtain a reference block split structure according to an embodiment of the disclosure.

FIG. 12 shows an example where a block split structure for a previously coded CTU (1201) is modified to obtain a reference block split structure for a CTU (1202) according to an embodiment of the disclosure. A previously coded CTU (1201) is split with a QT split into four 64×64 blocks (1211)-(1214) at a first level (e.g., a CTU level). A top-right 64×64 block (1212) is further split into smaller partitions while the three 64×64 blocks (1211), (1213), and (1214) are not split, resulting in the block split structure for the previously coded CTU (1201). When the block split structure for the previously coded CTU (1201) is used as a predictor, the detailed splitting structure of the top-right 64×64 block (1212) can be removed and then represented by a single QT split (1230) at a top-right 64×64 block (1222), as shown in the reference block split structure for the CTU (1202). The reference block split structure for the CTU (1202) can split a CTU (1202) at a CTU level with a QT split into four 64×64 blocks (1221)-(1224). Subsequently, the top-right 64×64 block (1222) is further split into four smaller blocks (1231)-(1234) by the QT split (1230). In an example, the reference block split structure (e.g., the reference block split structure for the CTU (1202)) modified from the initial block split structure (e.g., the block split structure for the previously coded CTU (1201)) is simplified, and thus can have a less split depth and/or a less number of leaf nodes than those of the initial block split structure. Modifying the initial block split structure to obtain the reference block split structure can be advantageous. When the reference block split structure is simplified, such as shown in FIG. 12, there is less information to store for the reference block split structure, and thus saving memory space. Further, various block split structures for CTUs may be represented by a smaller number of variations as the reference block split structures.

Any suitable modification rules can be applied to obtain the reference block split structure. In an example, only QT splits can be used or allowed in the reference block split structure, such as shown in the reference block split structure for the CTU (1202). In an example, when only the QT splits are allowed in the reference block split structure, only one bit or one flag is used to indicate the QT split, and no other bit is needed to indicate how to implement the QT split, thus improving the coding efficiency.

In an example, QT split(s) and BT split(s) can be used in the reference block split structure, and other splitting method(s) are disallowed in the reference block split structure.

In an embodiment, only QT splits can be used in the reference block split structure. Further, up to L split level(s) is allowed in the reference block split structure. L can be an integer, such as 0, 1, 2, or the like. In an example, L is 0, and a CTU predicted with the reference block split structure includes a single block, for example, of 128×128 without being split. In an example, L is 1, the CTU predicted with the reference block split structure can be a single block of 128×128 samples without being split or include four 64×64 blocks with one split. In an example, L is 2, the CTU predicted with the reference block split structure can be a single block of 128×128 samples or include four 64×64 blocks where each 64×64 block may be further split into four 32×32 blocks.

In an example, the split level L is determined by a complexity of a block or a region, such as a 64×64 region. Referring to FIG. 12, the four 64×64 regions or blocks (1221)-(1224) in the reference block split structure can have different split depths for the QT split. For example, the top-right 64×64 region (1222) can be further split one time while the other three 64×64 regions are not split and are maintained at a 64×64 level. Accordingly, the split depth L for the region (1222) is 2, and the split depth L for the regions (1221), (1223), and (1224) are 1.

According to aspects of the disclosure, the reference block split structure can be determined based on the initial block split structure, for example, indicated in the reference partitioning information. The current block split structure can be determined based on the reference block split structure.

If predicted by the reference block split structure, the current block split structure for the current CTU can use the reference block split structure directly. Alternatively, the reference block split structure can be further modified to obtain the current block split structure (also referred to as a final block split structure) for the current CTU. Whether to use the reference block split structure with or without modification can be signaled or pre-determined.

According to aspects of the disclosure, the coding information can include a flag indicating whether the reference block split structure is modified to obtain the current block split structure of the current CTU. Thus, whether the reference block split structure is modified to obtain the current block split structure of the current CTB can be determined based on the flag In an example, the flag is used to signal whether the reference block split structure is used with or without modification. If the reference block split structure is used with modification, further modification(s) can be signaled after the prediction with the reference block split structure.

In an example, at each predicted child node, a split flag is used to signal whether a further split is to be used on top of the current prediction. If the further split is to be used, a type of the split can be signaled.

In an example, the current CTU is first partitioned according to the reference block split structure to obtain a plurality of child nodes. Subsequently, the recursive partitioning as described in Table 1 can be applied to each of the child node to further divide the child node if necessary. For example, at each child node, a split flag is used to signal whether a further split is to be used. If the further split is to be used, a type of the split can be signaled. Accordingly, the current CTU is partitioned using a combination of the reference block split structure and signaling, and thus reducing signaling overhead since the reference block split structure is not signaled.

In an example, the current block split structure for the current CTU can use the reference block split structure directly (e.g., without modification). Accordingly, the current block split structure for the current CTU can be identical to the reference block split structure. No more split flags are signaled or inferred, and thus the coding efficiency can be improved. For example, the reference block split structure is four 64×64 blocks. If the reference block split structure is used, the current CTU can be split into four 64×64 blocks and there is no need to check if any of the 64×64 blocks is to be split further.

According to aspects of the disclosure, the reference block split structure can be modified to obtain the current block split structure for the current CTU. In an example, the reference block split structure is used to determine the current block split structure for the current CTU, the current CTU can first be partitioned based on the reference block split structure and potentially add more split flags on top of the predicted structure. For example, the reference block split structure is four 64×64 blocks. If the reference block split structure is used, the current CTU can be split into four 64×64 blocks (also referred to as child nodes) first. For each of the child nodes (e.g., each 64×64 block), a split flag may be signaled or derived (e.g., inferred) to indicate whether the child node is to be split further or not. If the child node is to be split further, additional information (e.g., including a type of the split and a split direction (e.g., a vertical direction, a horizontal direction) can be signaled. Each of the resulting child nodes can be processed recursively in a similar way as that described in Table 1. Though the additional information may be signaled, modifying the reference block split structure to obtain the current block split structure may improve coding efficiency since the reference block split structure may not need to be signaled.

Figure 13:
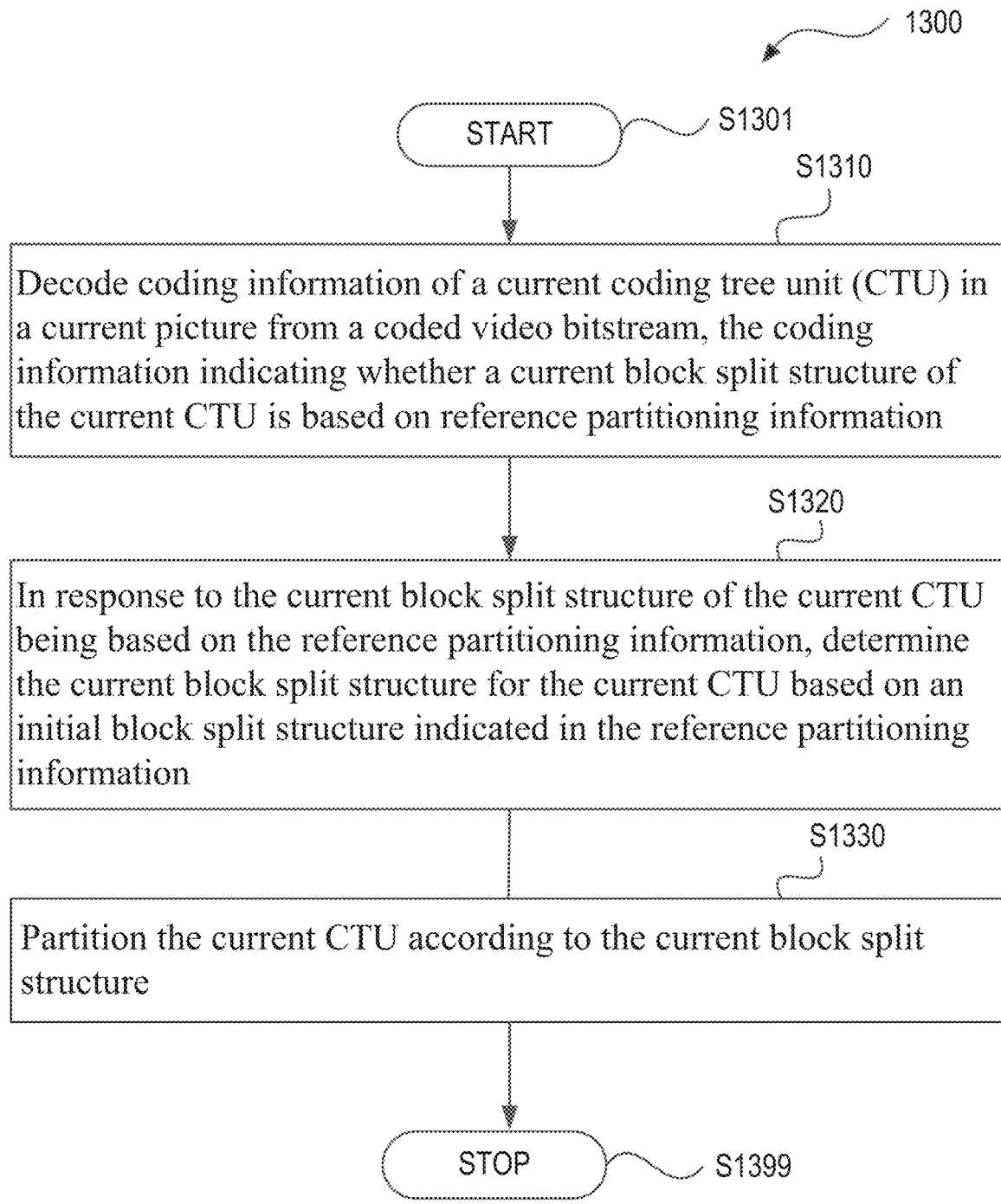
FIG. 13 shows a flow chart outlining a process (1300) according to an embodiment of the disclosure.

FIG. 13 shows a flow chart outlining a process (1300) according to an embodiment of the disclosure. The process (1300) can be used to partition a current CTU (e.g., a current CTB, a current luma CTB, current chroma CTB(s)), so as to generate a prediction block for a current block under reconstruction in the current CTU. In various embodiments, the process (1300) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1300) is implemented in software instructions, thus when the processing circuitry executes the software instructions, the processing circuitry performs the process (1300). The process (1300) starts at (S1301) and proceeds to (S1310).

At (S1310), coding information of a current CTU in a current picture can be decoded from a coded video bitstream. The coding information can indicate, for example, using a SPF, whether a current block split structure of the current CTU is based on reference partitioning information. When the coding information is determined to indicate that the current block split structure of the current CTU is based on the reference partitioning information, the process (1300) proceeds to (S1320). Otherwise, the process (1300) proceeds to (S1399), and terminates.

At (S1320), the current block split structure for the current CTU can be determined based on an initial block split structure indicated in the reference partitioning information, as described above. The initial block split structure can be (i) of a previously decoded CTU (e.g., a spatial neighboring CTU of the current CTU, a temporal neighboring CTU of the current CTU, a previously decoded CTU having a block split structure in a history-based buffer) decoded prior to the current CTU in a decoding order or (ii) indicated by a high level header at a level (e.g., a picture level, a slice level) higher than a CTU level.

In an example, a reference block split structure is determined based on the initial block split structure with or without modification. Further, the current block split structure for the current CTU can be determined based on the reference block split structure with or without modification.

At (S1330), the current CTU can be partitioned according to the current block split structure. The process (1300) proceeds to (S1399), and terminates.

The process (1300) can be suitably adapted to various scenarios and steps in the process (1300) can be adjusted accordingly. One or more of the steps in the process (1300) can be adapted, omitted, repeated, and/or combined. Any suitable order can be used to implement the process (1300). Additional step(s) can be added to the process (1300). For example, after partitioning the current CTU at (S1330) into CUs, each CU can be reconstructed, as described above. In an example, at (S1310), when the coding information is determined to indicate that the current block split structure of the current CTU is not based on the reference partitioning information, the current CTU can be partitioned recursively based on various split flags, such as described in Table 1.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
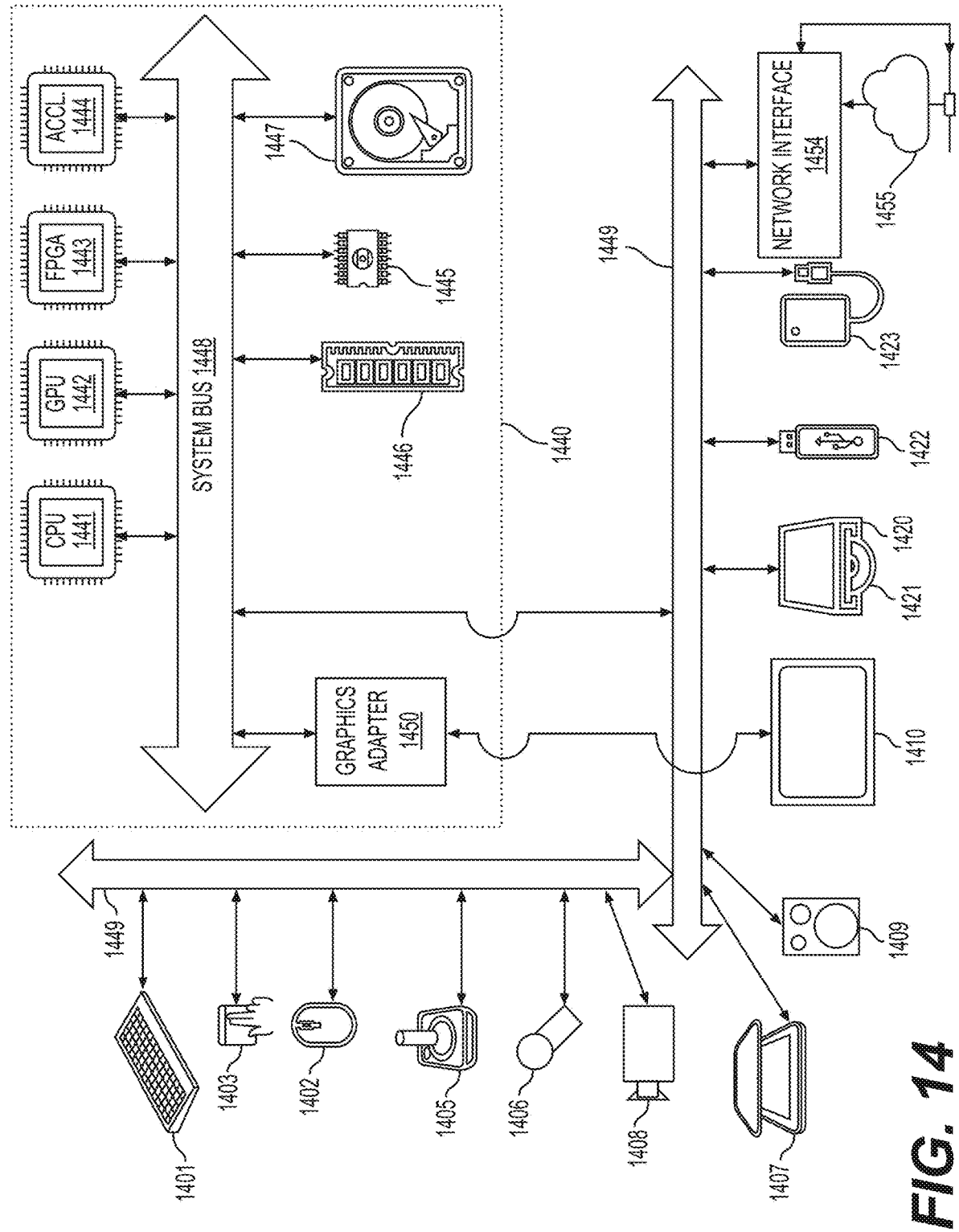
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapter (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, a display (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
QT: Quaternary-Tree
BT: Binary-Tree
TT: Ternary-Tree
MTT: Multi-Type Tree
SPS: Sequence Parameter Set
PPS: Picture Parameter Set While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video decoding in a decoder, comprising:
decoding coding information of a current coding tree block (CTB) in a current picture from a coded video bitstream, the coding information indicating whether a current CTB split structure of the current CTB is to be determined based on a reference CTB split structure; and
in response to the coding information indicating that the current CTB split structure of the current CTB is determined based on the reference CTB split structure,
determining the current CTB split structure for the current CTB based on the reference CTB split structure, the reference CTB split structure being a shared reference CTB split structure indicated by a high level header of a high level coding structure at a level higher than a CTB level, the high level coding structure including the current CTB and one or more other CTBs, and the shared reference CTB split structure being sharable by the current CTB and the one or more other CTBs in the high level coding structure; and
partitioning the current CTB according to the current CTB split structure.

2. The method of claim 1, wherein the reference CTB split structure is stored in a history-based buffer.

3. The method of claim 1, wherein
the shared reference CTB split structure is one of a plurality of shared reference CTB split structures included in the high level header, and
the shared reference CTB split structure is indicated by an index included in the high level header.

4. The method of claim 1, wherein the determining the current CTB split structure further comprises:
determining a modified reference CTB split structure based on the reference CTB split structure; and
determining the current CTB split structure based on the modified reference CTB split structure.

5. The method of claim 4, wherein the current CTB split structure of the current CTB is the reference CTB split structure.

6. The method of claim 4, wherein the determining the current CTB split structure of the current CTB further comprises:
modifying the reference CTB split structure to obtain the current CTB split structure for the current CTB.

7. The method of claim 1, wherein
the coding information includes a flag indicating whether the reference CTB split structure is modified to obtain the current CTB split structure of the current CTB, and
the method further includes determining whether the reference CTB split structure is modified to obtain the current CTB split structure of the current CTB based on the flag.

8. The method of claim 1, wherein the reference CTB split structure is of a previously decoded CTB that is in the high level coding structure and decoded prior to the current CTB in a decoding order.

9. An apparatus for video decoding, comprising processing circuitry configured to:
decode coding information of a current coding tree block (CTB) in a current picture from a coded video bitstream, the coding information indicating whether a current CTB split structure of the current CTB is to be determined based on a reference CTB split structure; and
in response to the coding information indicating that the current CTB split structure of the current CTB is determined based on the reference CTB split structure,
determine the current CTB split structure for the current CTB based on the reference CTB split structure, the reference CTB split structure being a shared reference CTB split structure indicated by a high level header of a high level coding structure at a level higher than a CTB level, the high level coding structure including the current CTB and one or more other CTBs, and the shared reference CTB split structure being sharable by the current CTB and the one or more other CTBs in the high level coding structure; and
partition the current CTB according to the current CTB split structure.

10. The apparatus of claim 9, wherein the reference CTB split structure is stored in a history-based buffer.

11. The apparatus of claim 9, wherein
the shared CTB split structure is one of a plurality of shared reference CTB split structures included in the high level header, and
the shared reference CTB split structure is indicated by an index included in the high level header.

12. The apparatus of claim 9, wherein the processing circuitry is further configured to:
determine a modified reference CTB split structure based on the reference CTB split structure; and
determine the current CTB split structure based on the modified reference CTB split structure.

13. The apparatus of claim 12, wherein the processing circuitry is configured to:
modify the reference CTB split structure to obtain the current CTB split structure for the current CTB.

14. The apparatus of claim 9, wherein
the coding information includes a flag indicating whether the reference CTB split structure is modified to obtain the current CTB split structure of the current CTB, and
the processing circuitry is further configured to determine whether the reference CTB split structure is modified to obtain the current CTB split structure of the current CTB based on the flag.

15. The apparatus of claim 9, wherein the reference CTB split structure is of a previously decoded CTB that is in the high level coding structure and decoded prior to the current CTB in a decoding order.

16. A non-transitory computer-readable storage medium storing a program executable by at least one processor to perform:
decoding coding information of a current coding tree block (CTB) in a current picture from a coded video bitstream, the coding information indicating whether a current CTB split structure of the current CTB is to be determined based on a reference CTB split structure; and
in response to the coding information indicating that the current CTB split structure of the current CTB is determined based on the reference CTB split structure,
determining the current CTB split structure for the current CTB based on the reference CTB split structure, the reference CTB split structure being a shared reference CTB split structure indicated by a high level header of a high level coding structure at a level higher than a CTB level, the high level coding structure including the current CTB and one or more other CTBs, and the shared reference CTB split structure being sharable by the current CTB and the one or more other CTBs in the high level coding structure; and partitioning the current CTB according to the current CTB split structure.

17. The non-transitory computer-readable storage medium of claim 16, wherein
the shared reference CTB split structure is one of a plurality of shared reference CTB split structures included in the high level header, and
the shared reference CTB split structure is indicated by an index included in the high level header.

18. The non-transitory computer-readable storage medium of claim 16, wherein
the coding information includes a flag indicating whether the reference CTB split structure is modified to obtain the current CTB split structure of the current CTB, and
the program is executable by the at least one processor to further perform determining whether the reference CTB split structure is modified to obtain the current CTB split structure of the current CTB based on the flag.

19. The non-transitory computer-readable storage medium of claim 18, wherein the current CTB split structure of the current CTB is the reference CTB split structure.

20. The non-transitory computer-readable storage medium of claim 18, wherein the determining the current CTB split structure of the current CTB further comprises:
modifying the reference CTB split structure to obtain the current CTB split structure for the current CTB.

* * * * *